(No Model.)
C. T. TARPENNING.
TOASTER OR BROILER.
No. 406,547. Patented July 9, 1889.
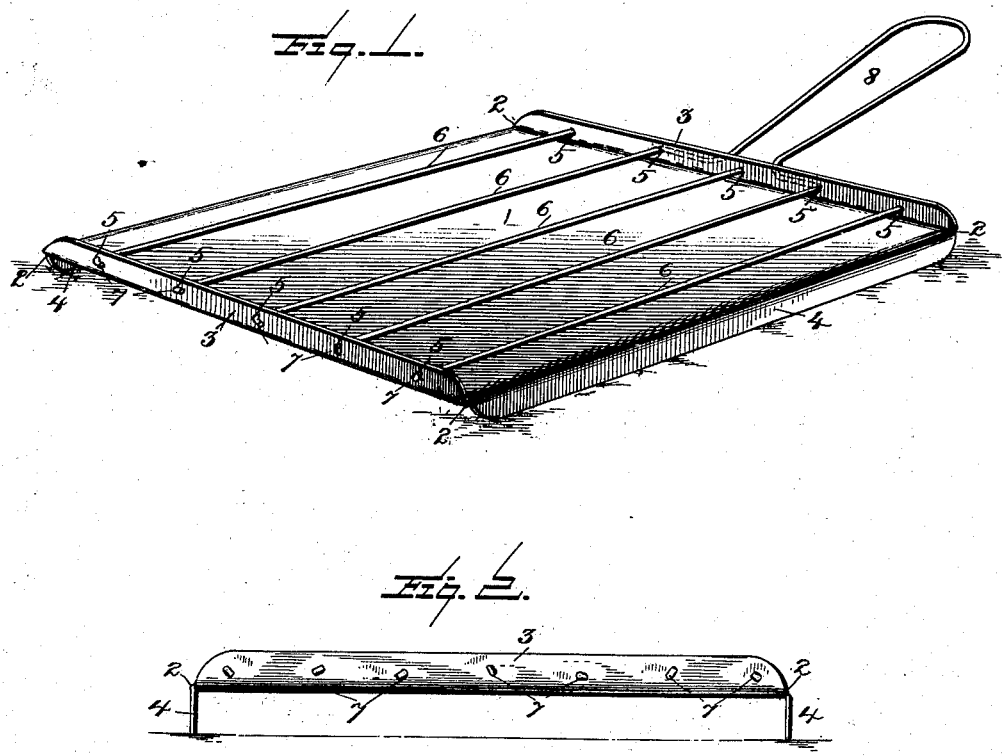
Witnesses:
L. C. Hill.
W. S. Duvall
Inventor
Charles T. Tarpenning
E. B. Stocking
Attorney.

UNITED STATES PATENT OFFICE.

CHARLES T. TARPENNING, OF LOS ANGELES, CALIFORNIA.

TOASTER OR BROILER.

SPECIFICATION forming part of Letters Patent No. 406,547, dated July 9, 1889.

Application filed October 15, 1888. Serial No. 288,090. (No model.)

*To all whom it may concern:*

Be it known that I, CHARLES T. TARPENNING, a citizen of the United States, residing at Los Angeles, in the county of Los Angeles, State of California, have invented certain new and useful Improvements in Toasters or Broilers, of which the following is a specification, reference being had therein to the accompanying drawings.

This invention has relation to culinary articles of that class known as "toasters" or "broilers;" and among the prime objects in view are to provide an inexpensive article to be used for the above purposes, that can be readily stamped or otherwise formed out of sheet metal, and when in use will prevent, so far as possible, the burning of the edibles undergoing the process of toasting or broiling.

Other objects and advantages of the invention will hereinafter appear, and the novel features thereof will be particularly pointed out in the claims.

Referring to the drawings, Figure 1 is a perspective of a toaster or broiler constructed in accordance with my invention, and Fig. 2 is a side elevation of the same.

Like numerals of reference indicate like parts in all figures of the drawings.

My invention, as will be hereinafter apparent, may be formed, by suitable dies and punches, from sheet metal, operated by suitable machinery, or, if desired, by any other means.

1 represents the body portion or base of the toaster, which, before being otherwise operated upon, is simply and preferably of a square or rectangular form. By any suitable punch or other tool a V-shaped notch is cut at each of the angles, as at 2, after which, by dies or other means, each two opposite sides are bent at an angle to the body portion, one pair of sides being bent in one direction, as at 3, and the remaining opposite sides being bent in a reverse direction, as at 4, the two latter, or it may be either, forming a support for the device upon the top of a stove and elevating the body portion a slight distance above the same, so as not to excessively heat the meat thereon. The opposite sides 3, or those sides or flanges that extend upwardly, are perforated at intervals, the perforations of one side or flange registering with those of the other, as at 5. Passing through these perforations, and extending across the body portion of the toaster from one flange 3 to the other, are a series of wires 6, which may be secured in place by heading or bending, as at 7, or otherwise. Any suitable handle may be provided; but for the purpose of cheapness I prefer to form the two wires on each side of the central wire 6 in a single piece, and project the same at its middle outside of the flange 3, to form a handle 8.

By this construction it is apparent that a toaster may be quickly and cheaply manufactured, and, when completed and in use, that the burning of articles being toasted—such as bread, meat, &c.—will so far as possible, and by reason of the toaster being elevated above the surface of the stove, be prevented from undue or excessive heat.

Having described my invention, what I claim is—

1. A toaster formed of light metal and having two of its opposite sides bent downwardly at an angle to its body portion and its remaining opposite sides bent upwardly at an opposite angle and perforated, and provided with transverse wires extending from side to side, substantially as specified.

2. A toaster formed of sheet metal, of a rectangular shape, and having each of its corners slit or recessed and two of its opposite sides bent downward to form a rest for the toaster, and its remaining opposite sides bent upwardly at a reverse angle and perforated, and provided with transverse wires extending from side to side, headed at their outer ends, two of the wires being extended to form a handle, substantially as specified.

3. The toaster 1, having the corner recesses 2, and having its opposite sides bent in reverse directions, as at 3 and 4, and the latter provided with a series of perforations 5, and transverse wires 6 mounted therein and bent to form a handle 8, substantially as specified.

In testimony whereof I affix my signature in presence of two witnesses.

CHARLES T. TARPENNING.

Witnesses:
L. B. SHERWOOD,
LEWIS DINGMAN.